United States Patent [19]

Mochizuki et al.

[11] Patent Number: 5,070,346

[45] Date of Patent: Dec. 3, 1991

[54] INK NEAR-END DETECTING DEVICE

[75] Inventors: Seiji Mochizuki; Takahiro Naka; Kazuhiko Hara; Akira Takagi; Yukihiro Hanaoka, all of Nagano, Japan

[73] Assignee: Seiko Epson Corporation, Tokyo, Japan

[21] Appl. No.: 642,761

[22] Filed: Jan. 18, 1991

[30] Foreign Application Priority Data

| | | | | |
|---|---|---|---|---|
| Jan. 30, 1990 | [JP] | Japan | ..................................... | 2-21022 |
| Mar. 20, 1990 | [JP] | Japan | ..................................... | 2-70318 |
| Nov. 29, 1990 | [JP] | Japan | ..................................... | 2-332640 |

[51] Int. Cl.[5] ........................ B41J 2/175; G01D 18/00

[52] U.S. Cl. ................................ 346/140 R; 73/304 R

[58] Field of Search ......... 346/140 R; 73/301, 304 R, 73/307, 313; 340/620; 101/364

[56] References Cited

U.S. PATENT DOCUMENTS

| | | | |
|---|---|---|---|
| 4,202,267 | 5/1980 | Heinzl et al. | 101/364 |
| 4,511,906 | 4/1985 | Hara | 346/140 R |
| 4,626,874 | 12/1986 | Murai et al. | 346/140 R |
| 4,782,754 | 11/1988 | Pohlig | 101/364 |
| 4,788,861 | 12/1988 | Lichti | 73/304 R |

OTHER PUBLICATIONS

IBM Technical Disclosure Bulletin, "Plotter Print Module", vol. 32, No. 2, Jul. 1989, p. 439.

*Primary Examiner*—Benjamin R. Fuller
*Assistant Examiner*—Alrick Bobb
*Attorney, Agent, or Firm*—Sughrue, Mion, Zinn, Macpeak & Seas

[57] ABSTRACT

In an ink near-end detecting device, a pair of electrodes are arranged in the porous material in the ink tank and in the ink pool provided below the ink tank, respectively, so that the time instant the ink in the porous material has been nearly used up is detected from the variation of the electrical resistance between the electrodes with the consumption of the ink in the porous material.

6 Claims, 4 Drawing Sheets

INK NEAR-END DETECTING DEVICE

BACKGROUND OF THE INVENTION

The present invention relates to a recording apparatus, and more particularly to a device for detecting the instant that the ink has been nearly used up in a recording apparatus (hereinafter referred to as "an ink near-end detecting device", when applicable).

When, in an ink jet type recording apparatus in which ink is ejected from the nozzles to record data on a recording medium, the ink in the ink tank is used up, of course it is impossible to continue the recording operation. If the ink supply is entirely depleted, air can pass into the passageways connecting the ink supply to the nozzle. As a result, it takes a considerably long period of time to start the recording operation again.

The difficulty can be overcome by providing a detector for detecting the ink level in the ink tank. However, this approach is not applicable to a recording apparatus in which the ink tank is mounted on a movable carriage. In such an apparatus, it is generally the practice apparatus to accommodate a porous material in the ink tank to hold the ink, thereby to prevent the entrance of bubbles into the passageways connecting the ink supply to the nozzles, which bubbles are formed by vibration caused when the carriage is returned. Accordingly, it is impossible for the detector to directly detect the time instant immediately before the ink is used up.

SUMMARY OF THE INVENTION

Accordingly, an object of this invention is to provide an ink near-end detecting device which can detect with high accuracy the time instant just before the ink in the porous material is used up.

For this purpose, provided by the invention is an ink near-end detecting device in which a pair of electrodes are arranged in the porous material in its ink tank and in the ink pool provided below the ink tank, respectively, so that the time instant that the ink in the porous material has been nearly used up is detected from a change in the electrical resistance between the two electrodes. Such a change occurs due to the fact that, as the ink in the porous material is consumed, the connection between the ink in the porous material and the ink in the ink pool is decreased.

A second object of the invention is to overcome the difficulty that the printer is abruptly stopped when an ink end detection signal is produced.

In order to achieve the second object, in another example of the ink near-end detecting device according to the invention, two set voltages, namely, a warning set voltage corresponding to the resistance change occurring when the ink has been nearly used up, and a final set voltage corresponding to the resistance change occurring when the ink has been completely used up are provided, so that after the warning signal is issued, the printer is stopped.

A third object of the invention is to allow a substantially constant quantity of ink to remain at the ink end detection time.

For this purpose, in another example of the ink near-end detecting device, the set voltage is changed with the consumption of ink per unit of time or with the ambient temperature.

The nature, principle and utility of the invention will become more apparent from the following detailed description when read in conjunction with the accompanying drawings, in which like parts are designated by like reference numerals or characters.

DESCRIPTION OF THE PREFERRED EMBODIMENTS

As conductive to a full understanding of the invention, first, the consumption of the ink absorbed in a porous material, and the change in electrical resistance with the consumption of the ink will be described with reference to FIGS. 3(*a*) through 3(*c*) and FIG. 4.

Figures 3A, 3B, 3C:
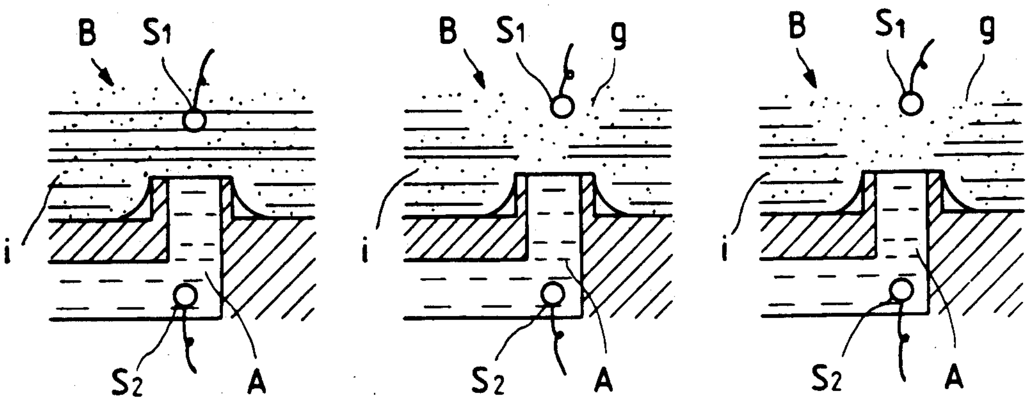
FIG. 3(*a*) through 3(*c*) show conditions before and after ink is consumed.
Figure 4:
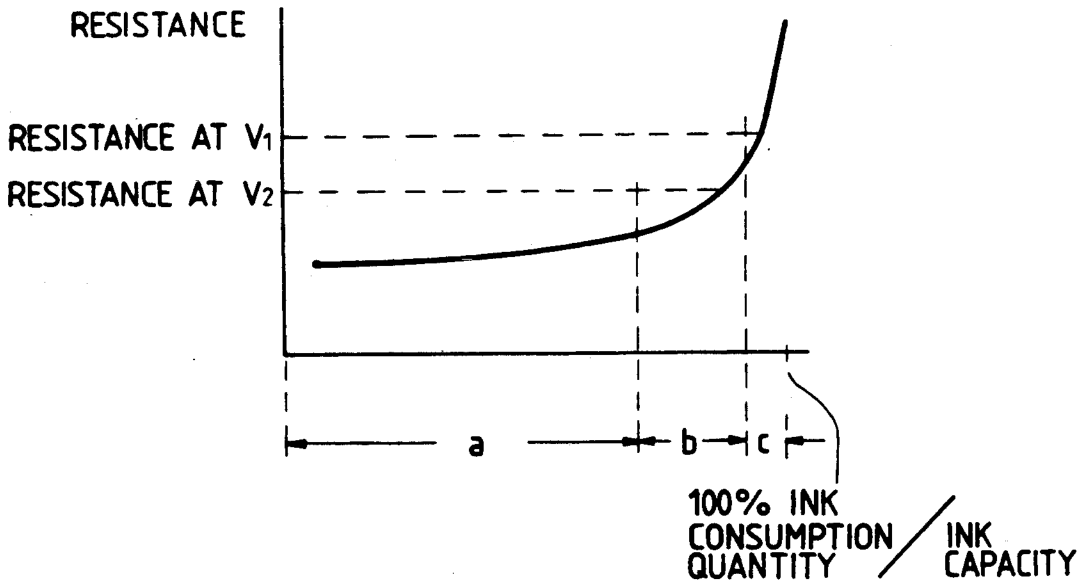
FIG. 4 shows the change in electrical resistance which occurs with the consumption of ink.

In the case where the upper inlet of an ink pool A is covered with a porous material B such as a polyurethane foamed material, the aqueous ink in the porous material B is supplied into the ink pool A by capillary action at the same rate at which the ink as much as consumed so as to maintain the ink pool A full (FIG. 3(*a*). Under this condition, the electrical resistance between two electrodes $S_1$ and $S_2$ positioned in the porous material B and in the ink pool A is low and constant (region a in FIG. 4). As the quantity of ink i in the porous material B decreases gradually, a gas q enters the porous material B, and part of the gas q, while being resisted by the porous material B, reaches the bottom of the latter, thus appearing in a part of the inlet of the ink pool. As a result, the connection of the ink in the porous material B and the ink in the ink pool A is partially cut. Hence, the resistance between the electrodes $S_1$ and $S_2$ is increased as much as the partial cut of the connection (the region b in FIG. 4). As the ink i in the porous material B is further consumed, the quantity of gas q entering the ink is increased, thus further decreasing the connection between two ink supplies. Finally, the ink in the porous material B becomes isolated from the ink in the ink pool A, whereupon the resistance between the two electrodes $S_1$ and $S_2$ becomes a maximum (region c in FIG. 4). By detecting this change in resistance between the electrodes, the time instant the ink is used up can be determined before it occurs.

Figure 1:
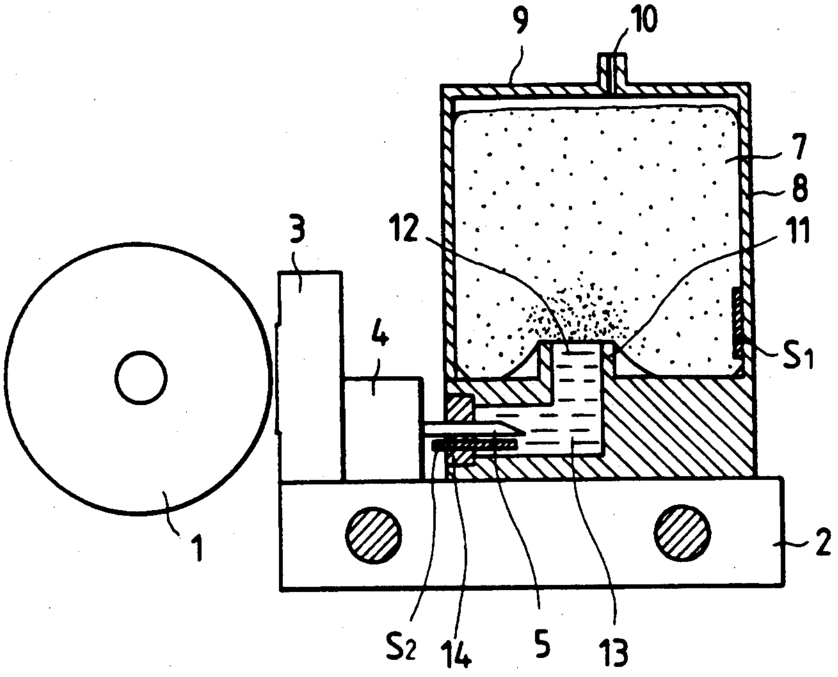
FIG. 1 shows an embodiment of an ink jet printer with an ink near-end detecting device.

FIG. 1 shows a typical embodiment of an ink near-end detecting device of the invention based on the above-described ink near-end detecting principle. A printing head 3 is provided on a carriage 2 which is moved along a platen 1 with the printing head 3 adjacent the platen 1. Provided behind the printing head 3 is an ink tank 8 which accommodates a foamed member 7 made of a porous material such as foamed polyurethane resin. The ink tank 8 has a cover 9 with a ventilation hole 10 through which the ink tank is allowed to communicate with the outside. The ink tank 8 has a pipe-shaped protrusion 11 which extends inwardly from the bottom in such a manner that the protrusion 11 is held in close contact with the foamed member 7. The protrusion defines the upper part of an ink pool 12 which extends downwardly to receive aqueous ink from the foamed member 7. The foamed member 7 is accommodated in the ink tank under the condition where the member 7 is compressed by the pipe-shaped protrusion 11. A communication hole 13 extends from the lower end portion of the ink pool 12 towards the printing head 3. The outer end of the communication hole 13 is sealed with a rubber plug 14. The rubber plug 14 is penetrated by a hollow needle 5 communicating with the printing head 3 through a filter chamber 4 so that the aqueous ink can be supplied from the ink tank 8 to the printing head 3.

Figure 2:
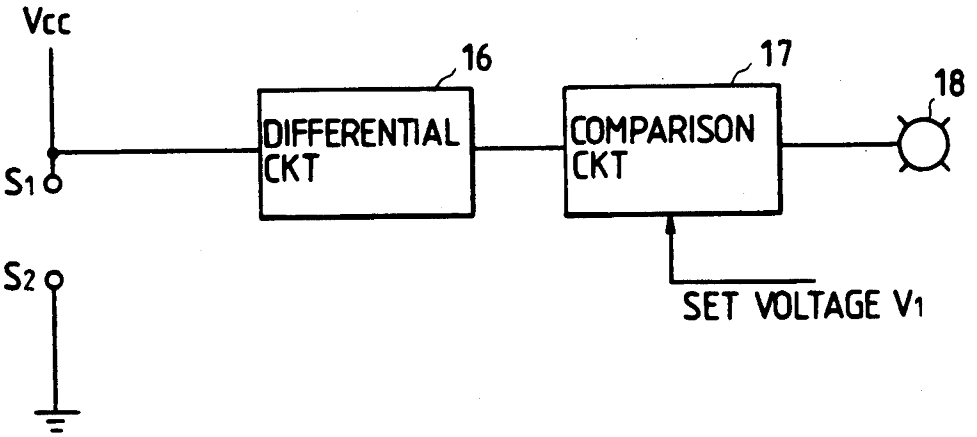
FIG. 2 shows an ink near-end detecting circuit according to the present invention.

FIG. 2 shows a first embodiment of an ink near-end detecting circuit according to the invention. In FIG. 2, $S_1$ and $S_2$ designate ink near-end detecting electrodes. The electrode $S_1$ is provided on the inner wall of the ink tank 8 and mounted so that it is held in contact with the foamed member 7. The electrode $S_2$ penetrates the rubber plug 14 and extends into the communication hole 13 to contact the aqueous ink. As shown in FIG. 2, a reference voltage $V_{cc}$ is applied to one of those electrodes $S_1$ and $S_2$, for instance, the electrode $S_1$, while the other electrode $S_2$ is grounded. The electrode $S_1$, to which the reference voltage $V_{cc}$ is applied, is connected to a resistance change detecting circuit composed of a differential circuit 16 and a comparison circuit 17.

When the resistance variation exceeds a predetermined value, an output signal (namely, an ink end signal) is provided to turn on a warning lamp 18 on the panel (not shown).

The ink near-end detecting operation of the above-described device will be described.

In the case where the foamed member 7 in the ink tank holds a sufficient quantity of ink, and the two electrodes $S_1$ and $S_2$ are connected through the aqueous ink, the resistance between the electrodes is low and stable. This stable condition is maintained as long as the foamed member 7 is wet, even if the quantity of ink decreases and the electrode $S_1$ is not directly in contact with the ink.

As the recording operation is continued, the quantity of ink in the foamed member 7 is gradually decreased, so that the gas (air) entering the foamed member 7 reduces the connection of the ink in the foamed member 7 and the ink in the pool. Hence, as shown by the region b in FIG. 4, the electrical resistance increases abruptly at a certain point. This resistance change is detected by the differential circuit 16, which provides a voltage corresponding to the resistance variation. When the voltage thus produced exceeds a set voltage $V_1$ applied to the comparison circuit 17, the latter provides an output signal to turn on the warning lamp 18; that is, the fact is displayed that the ink has been nearly used up.

The ink near-end detecting circuit in which the output signal of the comparison circuit 17 is utilized to indicate the fact that the ink has been nearly used up is suitable for a ink near-end detecting device in which the ink pool 12 is sufficiently large in capacity or the opening of the ink pool is large enough so that the resistance changes slowly. On the other hand, in the case where the region b (FIG. 4) indicating the abrupt change in the resistance between the electrodes is narrow and the ink in the foamed member 7 is abruptly separated from the ink in the ink pool 12, in response to the output signal of the comparison circuit 17, the printing operation should be suspended immediately when the carriage 2 returns to its home position.

An ink pool 6 mm in diameter and 20 mm in depth was formed in the bottom of a transparent 30 cc ink tank accommodating a polyurethane resin foamed member. The polyurethane resin foamed member was impregnated with transparent aqueous ink from which the dye had been removed, and an injection needle was inserted into the lower end of the ink pool. Under this condition, the spread of air at the opening of the ink pool was observed while the ink was allowed to flow out at a rate of 0.5 l/min through the injection needle thus inserted. Through this experiment, it has been found that the variation in spread of the air, wherein part of the air appears in the opening of the ink pool and covers the whole area of the opening, thus separating the ink in the ink tank from the ink in the ink pool, can be represented by a variation in electrical resistance accurately. Furthermore, it has also been found that the 24 ml of ink could be discharged by the time instant that the ink in the ink tank is separated from the ink in the ink pool. Therefore, 350 A4 size recording sheets can be printed in a standard manner for the period of time which elapses from the time instant that the electrical resistance abruptly changes until the supply of the ink is suspended.

Figure 5:
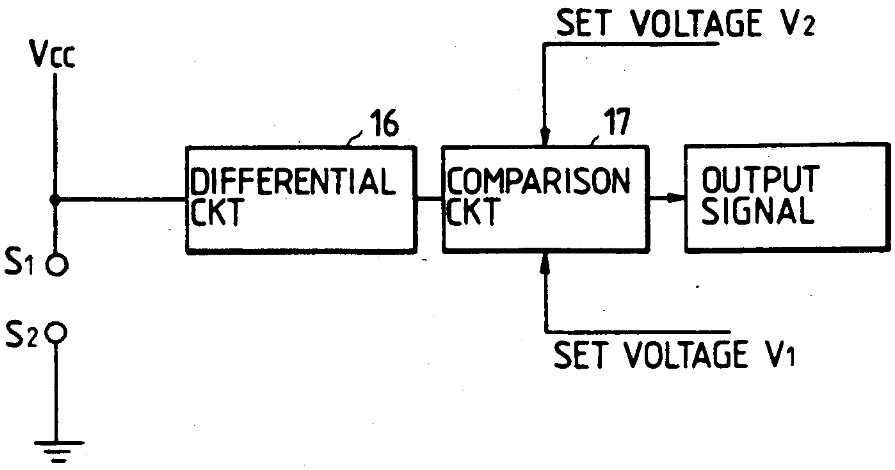
FIGS. 5 through 7 show an ink near-end detecting circuit according to another embodiment of the present invention.

FIG. 5 shows a second embodiment of an ink near-end detecting circuit according to the invention. The ink end detecting circuit includes a differential circuit 16 and a comparison circuit, similar to the circuit shown in FIG. 2. In the second embodiment of an ink end detecting circuit, a voltage $V_2$ corresponding to the resistance variation in the region b where the resistance increases abruptly, and a voltage $V_1$ corresponding to the region c where the resistance increases further are applied to the comparison circuit 17. When the resistance variation detected by the differentiating circuit 16 exceeds the first set voltage $V_2$, the comparison circuit 17 produces an output signal to turn on a warning lamp or the like, thereby to display on the panel or the like the fact that the ink in the ink tank 8 has been nearly used up. When the resistance increases further so that the resistance variation detected exceeds the second set voltage $V_1$, the comparison circuit produces an output signal causing the printing operation to be suspended when the carriage 2 returns to its home position.

Figure 6:
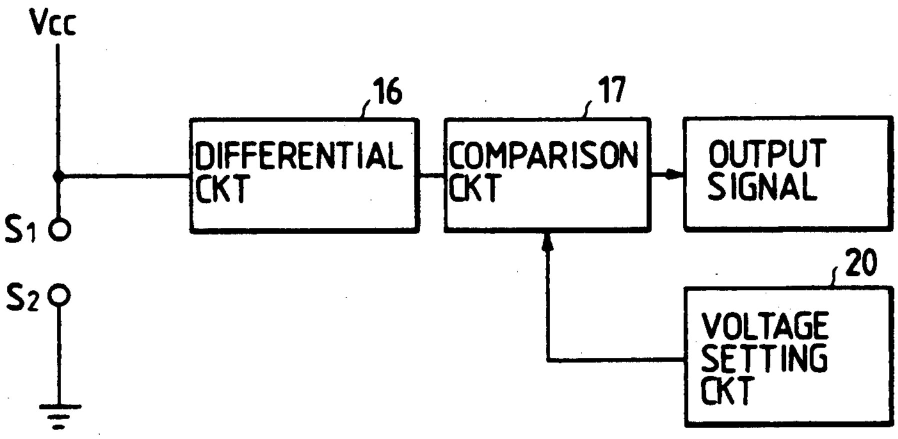

FIG. 6 shows a third example of an ink near-end detecting circuit according to the invention. The circuit includes a differential circuit 16, and a comparison circuit 17, similar to the second example, and voltage setting circuit 20 for changing the set voltage applied to the comparison circuit to a desired value. That is, in the circuit shown in FIG. 6, normally the set voltage is determined so as to correspond to the resistance variation in the region c in FIG. 4. When the printing result becomes unacceptable, the operating condition is corrected, for instance, by sucking the ink out of the printing head with a pump. Also, the set voltage is set to a lower value so as to correspond to the resistance variation in the front half of the region b in FIG. 4. Hence, even in the case where the ink is consumed quickly and therefore a large quantity of air flows from the foamed matter 7 into the ink pool 12 so that the region b is reached quickly, the difficulty that an excessively large quantity of ink remains after ink near-end detection can be prevented.

Figure 7:
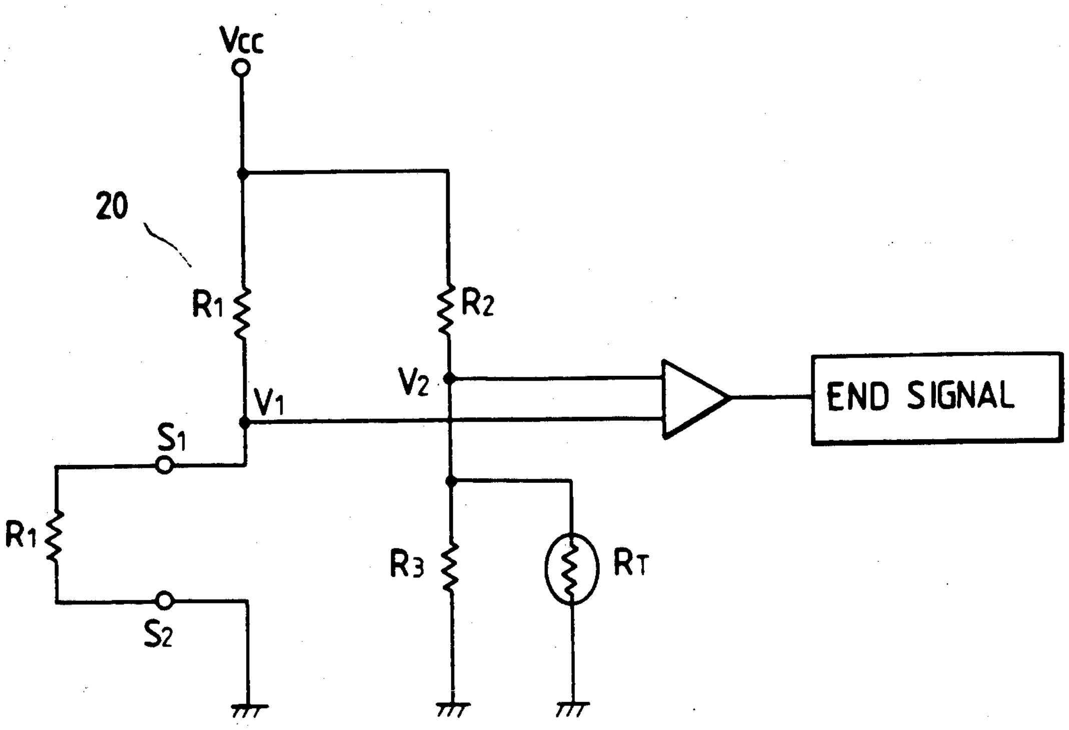

FIG. 7 depicts a fourth example of an ink near-end detecting circuit according to the invention. With this embodiment, at the point of ink near-end detection a substantially constant quantity of ink is allowed to remain, even if the viscosity of the ink changes with the ambient temperature. In this circuit, a thermistor $R_T$ is employed as voltage setting device to change the set voltage according to the ambient temperature. The employment of the voltage setting device eliminates the difficulty that, at low temperatures, the ink in the foamed member 7 is reduced in fluidity, that is, the fluidity of the air is increased relative to that of the ink, and therefore, the region b is reached quickly, and the ink near-end detection is made too early. In FIG. 7, $R_i$ designates the resistance between the electrodes $S_1$ and $S_2$.

The above-described ink near-end detecting circuits can be implemented using conventional digital or analog circuits. The hollow needle 5 may be employed as the electrode $S_2$ provided on the side of the ink pool 12.

Figure 8:
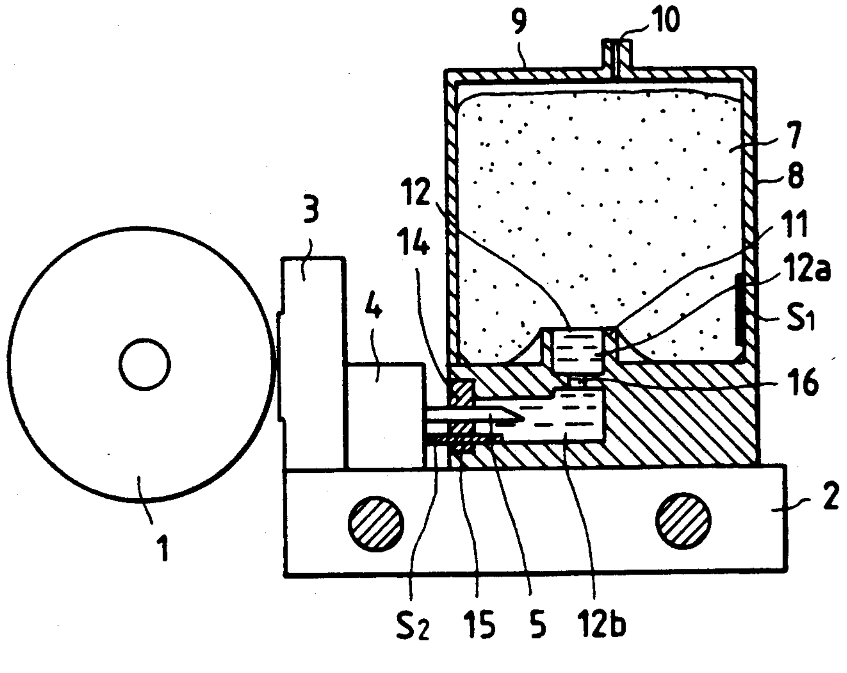
FIG. 8 shows an ink pool in the ink near-end detecting device according to a further embodiment of the present invention.

FIG. 8 shows a modification of the ink pool 12 in the ink near-end detecting device. In this device, the difficulty is prevented that part of the air appearing at the inlet of the ink pool 12 flows into the ink pool 12. To achieve this effect, the ink pool 12 has a small-diameter portion 16 at the middle which is smaller in diameter than the other portions, so that it has an upper chamber 12*a* and a lower chamber 12*b* on opposite sides of the portion. With the device thus modified, even if a bubble enters the ink pool 12, it will not flow to the printing head 3 but will be detained in the upper chamber 12.

While there has been described preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. An ink near-end detecting device comprising:
means for forming an ink pool communicating with a printing head, said ink pool being formed in a lower position of an ink tank which accommodates a porous material containing an aqueous ink;
a pair of electrodes arranged in a part of said porous material and in a part of said ink pool, respectively;
means for supplying at least one signal representing a predetermined resistance reference value; and
resistance change detecting means for detecting a condition that said ink in said ink tank has been nearly used up from a change of the resistance between said electrodes of more than said predetermined reference resistance value.

2. The ink near-end detecting device as claimed in claim 1, wherein said supplying means comprises means for applying to said resistance change detecting means a warning set voltage corresponding to a change of resistance between said electrodes occurring when said ink has been nearly used up, and means for applying to said resistance change detecting means a final set voltage corresponding to a change of resistance between said electrodes occurring when said ink has been used up.

3. The ink near-end detecting device as claimed in claim 1, in which said supplying means supplies at least one signal representing a predetermined voltage corresponding to said predetermined resistance reference value which can be changed optionally.

4. The ink near-end detecting device as claimed in claim 1, in which a predetermined voltage corresponding to said predetermined resistance reference value applied to said resistance change detecting means is changed according to ambient temperature.

5. The ink near-end detecting device as claimed in claim 4, wherein said resistance change detecting means comprises a thermistor.

6. The ink near-end detecting device as claimed in claim 1, in which said ink pool has a portion which is smaller in diameter than remaining portions thereof such that said ink pool has an upper chamber and a lower chamber on opposite sides of said portion.

* * * * *